United States Patent [19]

Gioutsos et al.

[11] Patent Number: 5,446,661
[45] Date of Patent: Aug. 29, 1995

[54] ADJUSTABLE CRASH DISCRIMINATION SYSTEM WITH OCCUPANT POSITION DETECTION

[75] Inventors: Tony Gioutsos, Brighton; Edward J. Gillis, Canton; Walter E. Chapelle, Southfield; Carolyn A. Swayze, Northville, all of Mich.

[73] Assignee: Automotive Systems Laboratory, Inc., Farmington Hills, Mich.

[21] Appl. No.: 48,366

[22] Filed: Apr. 15, 1993

[51] Int. Cl.⁶ .................. B60R 21/12; B60R 21/32
[52] U.S. Cl. .................. 364/424.05; 340/436; 307/10.1; 280/735; 180/273; 180/282
[58] Field of Search .......... 364/424.05; 280/735; 307/10.1; 180/268, 282, 273; 340/436

[56] References Cited

U.S. PATENT DOCUMENTS

| | | | |
|---|---|---|---|
| 4,620,721 | 11/1986 | Scholz et al. | 280/735 |
| 4,625,329 | 11/1986 | Ishikawa et al. | 382/1 |
| 4,985,835 | 1/1991 | Sterler et al. | 364/424.05 |
| 5,071,160 | 12/1991 | White et al. | 280/735 |
| 5,074,583 | 12/1991 | Fujita et al. | 280/735 |
| 5,118,134 | 6/1992 | Mattes et al. | 280/735 |
| 5,161,820 | 11/1992 | Vollmer | 180/273 |
| 5,184,844 | 2/1993 | Goor | 280/733 |
| 5,229,943 | 7/1993 | Eigler et al. | 364/424.05 |
| 5,232,243 | 8/1993 | Blackburn et al. | 280/732 |
| 5,256,904 | 11/1993 | Tohbaru | 307/10.1 |
| 5,291,014 | 3/1994 | Brede et al. | 280/735 |
| 5,301,772 | 4/1994 | Honda | 180/268 |
| 5,330,226 | 7/1994 | Gentry et al. | 280/735 |

Primary Examiner—Kevin J. Teska
Assistant Examiner—Tyrone V. Walker
Attorney, Agent, or Firm—Lyman R. Lyon

[57] ABSTRACT

A method and system for discriminating motor vehicle crashes to actuate a safety restraint (10) utilizes an optical vehicle occupant position detector (12) to generate data (22) representative of the position of an occupant relative to fixed structure within the vehicle. The data (22) is subsequently used by a signal processor/discrimination unit (26) as criteria for a parameter based crash discrimination analysis, and for adjusting parameters of the discrimination analysis, such as changing the discrimination threshold values. The occupant position data optimizes the discrimination analysis used in the system (10) due to the system's ability to customize the discrimination analysis in real time to match actual conditions of a vehicle occupant. Occupant position is determined by detecting the relative intensity, or average of scattering angles of a light beam (34) reflectively scattered by the occupant (24). An optical, low threshold safing sensor (40) can further be used to provide system calibration, discrimination of spurious occupant movement, and data representative of vehicle acceleration.

17 Claims, 5 Drawing Sheets

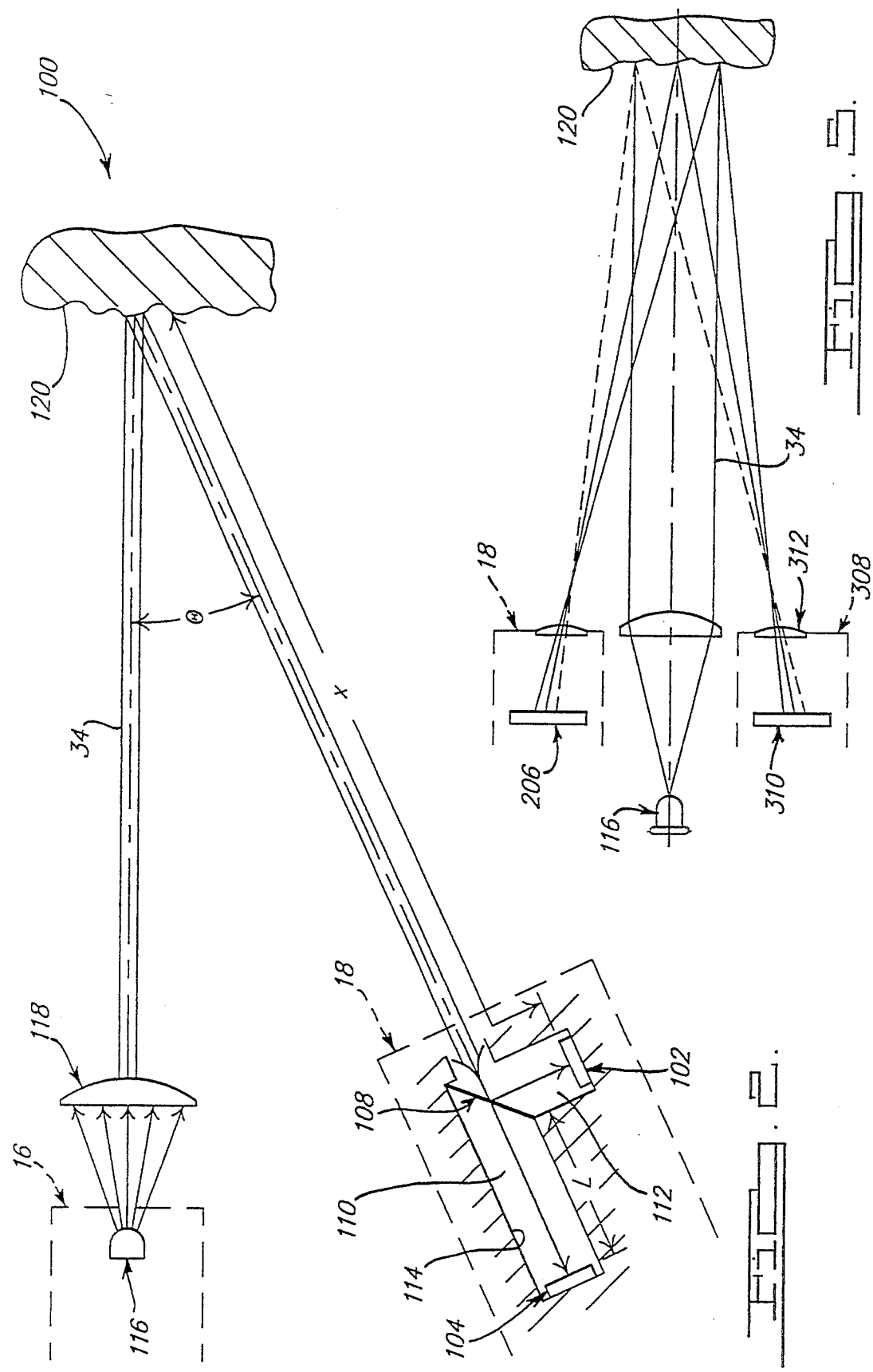

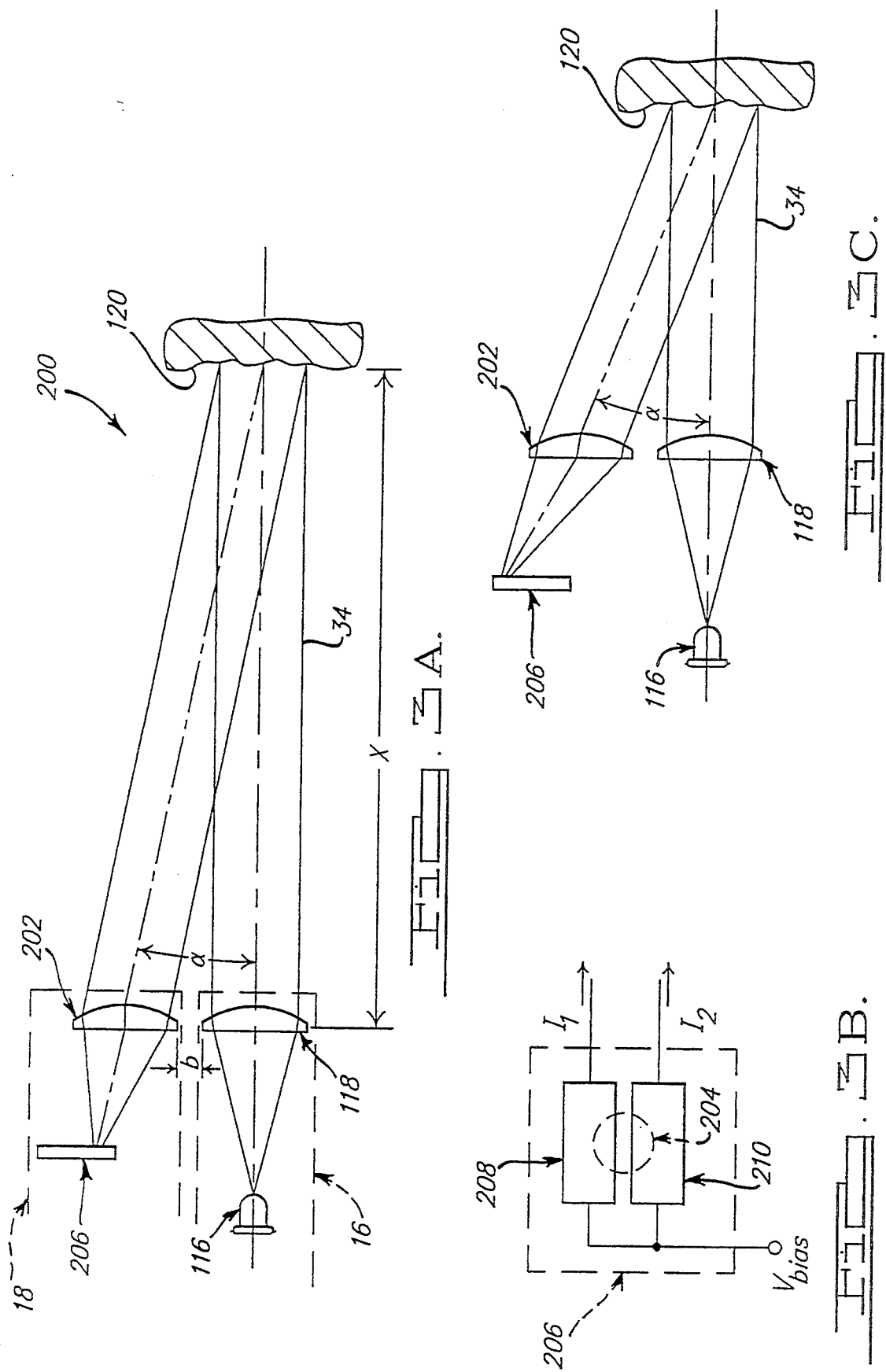

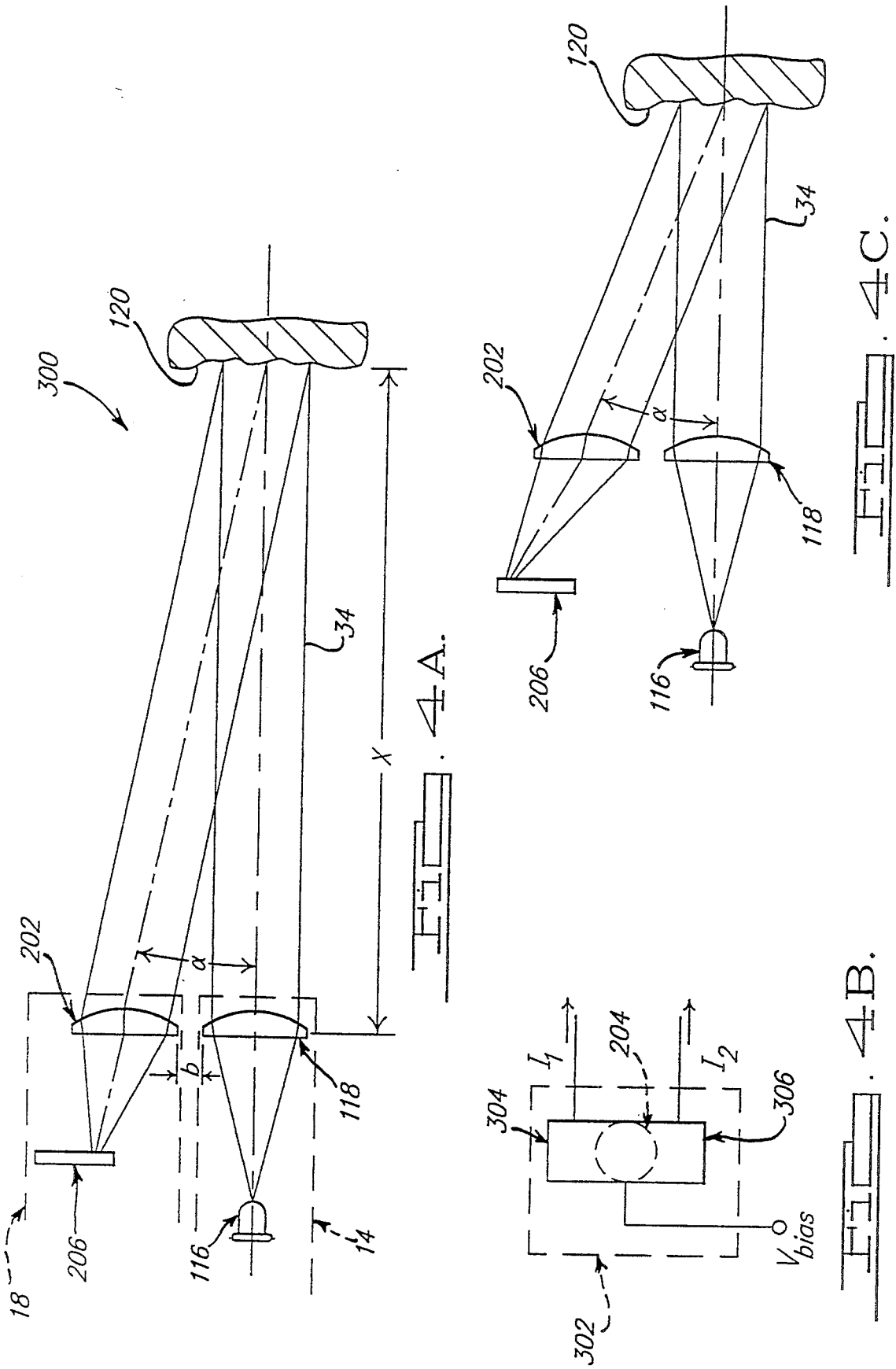

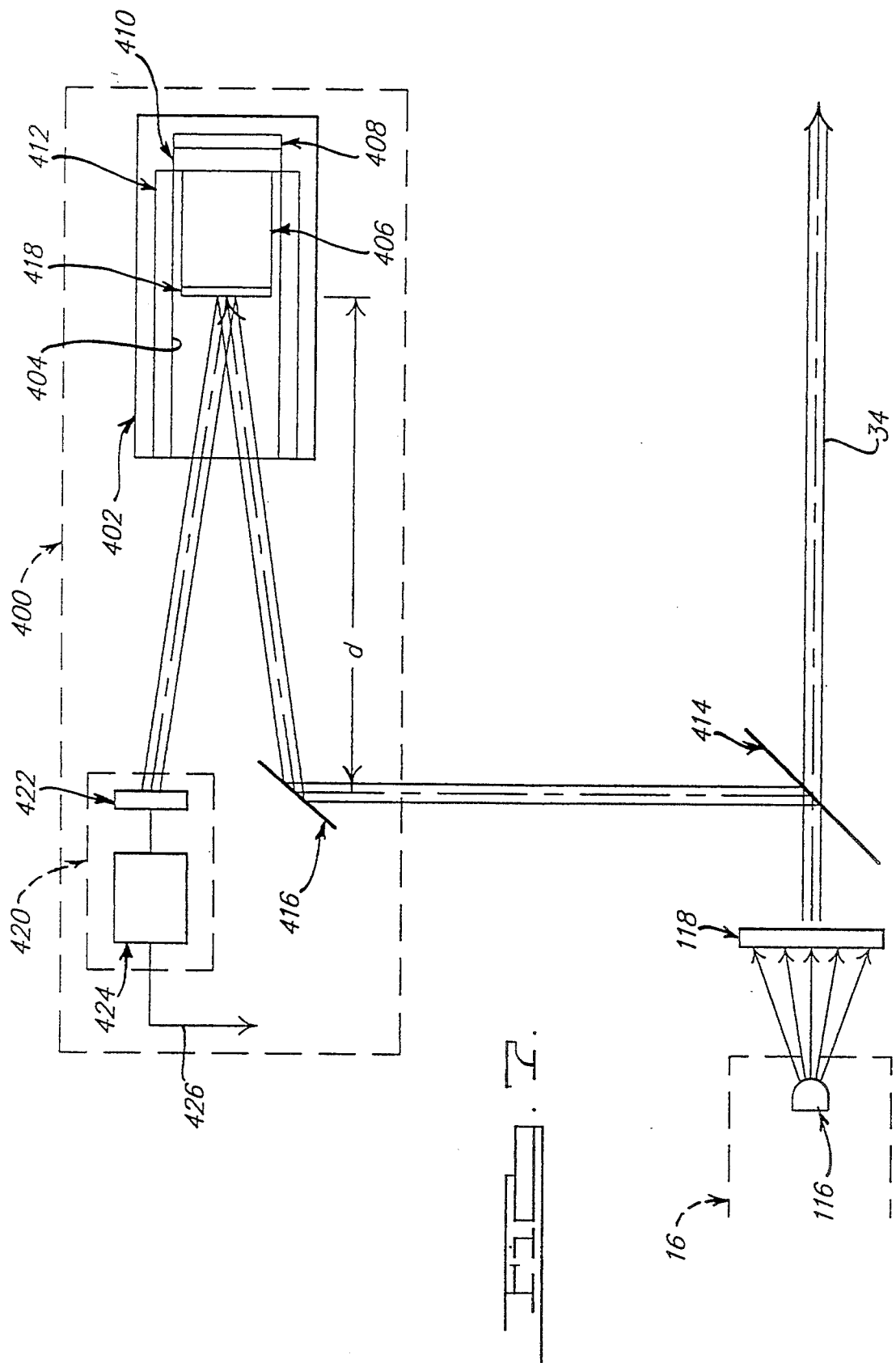

ADJUSTABLE CRASH DISCRIMINATION SYSTEM WITH OCCUPANT POSITION DETECTION

BACKGROUND OF THE INVENTION

The present invention relates to motor vehicle crash discrimination systems utilized for actuating or deploying a passenger safety restraint, and more specifically to apparatus and method for improving reliability of a motor vehicle crash discrimination system.

Conventional vehicle crash discrimination systems typically employ at least one mechanical, electromechanical, or electronic acceleration sensor affixed to the vehicle for sensing vehicle acceleration. The output of the sensor(s) are supplied to a discrimination circuit for comparison to a predetermined threshold value. If the predetermined threshold value is exceeded, the discrimination circuit will output a signal which actuates or deploys a passenger safety restraint, such as an airbag or passive seat belt mechanism.

However, conventional mechanical or electromechanical accelerometer based crash discrimination systems do not account for variations in passenger/occupant conditions in determining whether to actuate the safety restraint. More specifically, conventional accelerometer based crash discrimination systems are generally designed to assume nominal conditions, such as 50th percentile male, actual presence of a vehicle occupant, and failure of an occupant to wear a seat belt. The assumption of these crash conditions are necessary to insure proper actuation of the safety restraint when severe deceleration of the vehicle is detected by the accelerometer. Such assumptions inherently cause unnecessary, undesired, or improperly-timed actuation of the safety restraint in conditions where no occupant is present, in marginal crash situations where a seat belt provides sufficient safety protection for the occupant, or in situations where the occupant is improperly positioned relative to the safety restraint such that actuation of the safety restraint could potentially injure the occupant.

Further, each type of vehicle structurally reacts in a unique manner when experiencing identical crash situations. Since conventional accelerometer based crash discrimination systems detect crash situations based on deceleration of the vehicle, the accelerometer must be specifically calibrated for the particular type of vehicle to which it will be mounted. The requirement of unique calibration adds to the cost and complexity of conventional accelerometer based crash discrimination systems.

Another known vehicle crash discrimination system disclosed in U.S. Pat. No. 5,118,134 to Mattes et al measures both the forward displacement and/or velocity of vehicle occupant, and the acceleration of the vehicle in determining when to actuate a safety restraint. The forward displacement or velocity of the occupant is measured using ultrasonic, light or microwave signals. The vehicle acceleration is compared to a first threshold value, the forward displacement of the occupant is compared to a second threshold value, and the velocity of the occupant is compared to a third threshold value. The safety restraint is actuated when the first threshold value is exceeded, and either the second or third threshold values are exceeded.

While the system disclosed in U.S. Pat. No. 5,118,134 improves reliability over conventional accelerometer based crash discrimination system by measuring occupant displacement or velocity, the system is still relatively rigid because of the use of preset threshold values as the decisional criteria for actuating the safety restraint. This arrangement does not allow the crash discrimination system to accommodate various occupant conditions which can affect the desirability of actuating the safety restraint.

SUMMARY OF THE INVENTION

It is therefore an object of the present invention to provide a method and system for vehicle crash discrimination having increased efficiency and reliability in actuating or deploying a safety restraint such as an air bag.

It is another object of the present invention to provide a method and system for vehicle crash discrimination which continuously detects various vehicle occupant positions for optimizing a discrimination analysis to achieve increased efficiency and reliability in actuating a safety restraint.

It is another object of the present invention to provide a method and system for discriminating vehicle crashes which adjusts a decision period used for determining when to actuate a safety restraint, wherein the adjustments are based on the distance between a vehicle occupant and a potential impact point within the vehicle, and the change in distance over a period of time.

It is another object of the present invention to provide a method and system for discriminating vehicle crashes which determines the distance between a vehicle occupant and a potential impact point within the vehicle, and utilizes this information for adjusting a discrimination analysis threshold value, and as criteria for determining whether to actuate an occupant safety restraint.

It is another object of the present invention to provide a method and system for discriminating vehicle crashes which utilizes an optical low threshold acceleration sensor to calibrate an optical occupant position sensing means, discriminate irrelevant occupant movement from movement caused by crash situations, and to generate an output signal representative of vehicle acceleration.

It is another object of the present invention to provide a method and system for discriminating vehicle crashes which measures and records data concerning the changes in occupant position caused by actual crash situations.

In accordance with the present invention, a method and system for optimizing a discrimination analysis used for actuating a vehicle occupant safety restraint in response to a vehicle collision comprises continuously detecting a static position of a vehicle occupant relative to a fixed structure within the vehicle, generating data representative of the detected static occupant position, and adjusting a predetermined discrimination threshold value used in the discrimination analysis for determining whether actuation of the safety restraint is required based on the data representative of the detected static occupant position.

Also in accordance with the present invention, the method and system provides for detecting a change in the static vehicle occupant position, and determining the velocity of the occupant based on the detected change in position. The occupant velocity is then compared to a predetermined velocity threshold value. The safety restraint is actuated if the occupant velocity exceeds the velocity threshold value. The velocity threshold value can be adjusted based on the static occupant position data. Further, data representative of vehicle acceleration can be compared to a predetermined acceleration threshold value. The safety restraint is actuated if the data representative of vehicle acceleration exceeds the acceleration threshold value. Again, the acceleration threshold value can be adjusted based on the static occupant position data.

In accordance with the present invention, occupant position data increases the overall efficiency and reliability of the system by customizing the discrimination analysis in real time to match actual conditions of a vehicle occupant. Occupant position is determined by transmitting a beam of light at a designated area within the vehicle potentially occupied by a person, measuring a relative intensity level, or average of two scattering angles of at least a portion of the light beam which is reflectively scattered by a surface within the designated area, and determining the distance between the scattering surface and a fixed structure within the vehicle based on the measured intensity level. In a first embodiment, the distance is determined by detecting the intensity level of the reflectively scattered light beam received at two different locations separated by a predetermined distance, and determining the distance between the scattering surface and the fixed structure based on a ratio of the intensity levels detected at the two different locations.

In another embodiment, the distance between the scattering surface and the fixed structure is determined by transmitting the beam of light from a first location within the vehicle. A detector having a predetermined angle of light detection is positioned at a second location within the vehicle. The first and second locations are separated by a predetermined distance. The reflectively scattered light beam is focused by a lens to form a spot within the light detection area of the detector, wherein the location of the spot is indicative of the angle from which the light is received. The location of the spot within the light detection area is determined using a photosensitive device with a set of outputs that indicate spot position. The distance between the scattering surface and the fixed structure is determined by the angle from which the light is received.

A further embodiment of the present invention utilizes an optical low threshold safing sensor to provide calibration of the system, discern spurious occupant movement, and generate data representative of vehicle acceleration. At least a portion of the transmitted light beam is directed at a first end of an inertial sensing mass located within the safing sensor. The first end comprises a material having known reflectivity. The inertial sensing mass moves from a first position to a second position within the sensor in response to an acceleration force. Movement of the inertial sensing mass from the first position to the second position is detected based on a measured intensity level of the light reflectively scattered by the first end of the inertial sensing mass. Detection of the inertial sensing mass movement generates data representative of vehicle acceleration.

The present invention will be more fully understood upon reading the following detailed description of the preferred embodiment in conjunction with the accompanying drawings.

BRIEF DESCRIPTION OF THE DRAWINGS

FIG. 2 is a schematic illustration of a first embodiment for detecting the occupant position;

FIGS. 3 (a)-(c) are a schematic illustration of a second embodiment for detecting the occupant position;

FIGS. 4 (a)-(c) are a schematic illustration of a third embodiment for detecting the occupant position;

FIGS. 6 (a) and (b) respectively illustrate a plot of position data relative to a fixed structure within the velocity over time for irrelevant occupant movement, and occupant movement responsive to a vehicle crash; and FIG. 7 is a schematic illustration of a further embodiment of the vehicle crash discrimination system having an optical low threshold safing sensor.

DETAILED DESCRIPTION OF THE PREFERRED EMBODIMENT OF THE INVENTION

Figure 1:
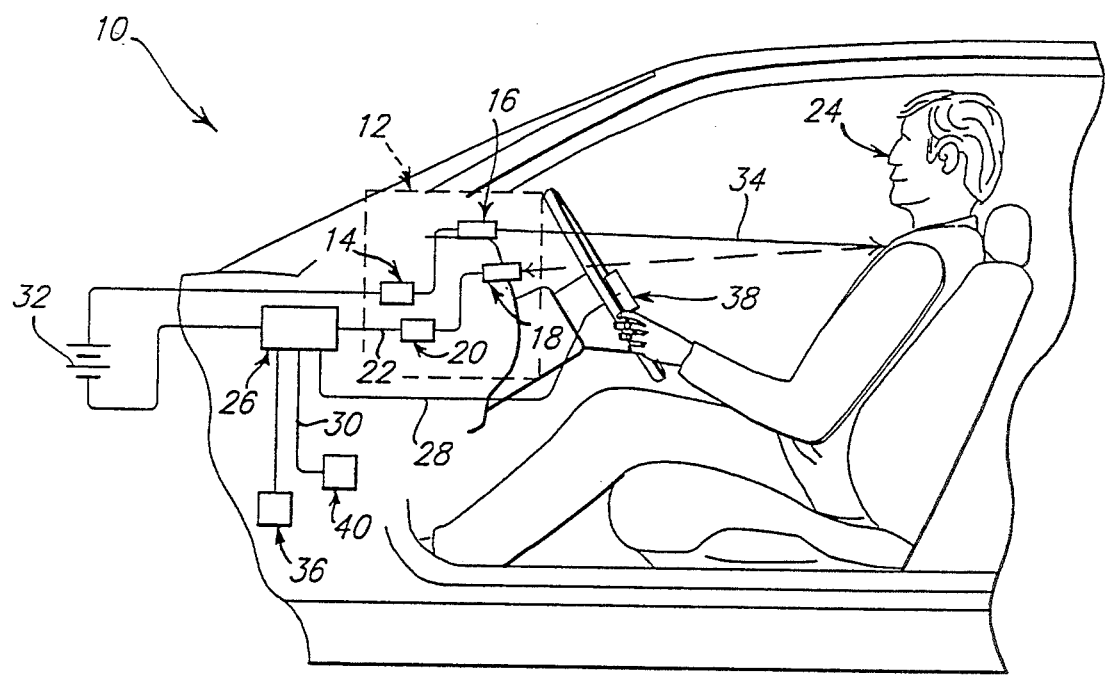
FIG. 1 is a schematic illustration of motor vehicle crash discrimination system having an occupant position detector in accordance with the present invention.

Referring to FIG. 1, there is shown a vehicle crash basic occupant condition discrimination system 10 which senses various occupant conditions in accordance with the present invention. The system 10 comprises an active infrared position detector 12 comprising a modulator 14 connected to an optical transmitter 16, and an optical receiver 18 connected to a synchronous demodulator 20. The demodulator 20 generates an output 22 indicative of the position of an occupant 24 relative to a potential impact point within the vehicle. Output 22 is supplied to a signal processor/discrimination unit 26 for storage in a memory 36, and subsequent use as decisional criteria in a vehicle crash discrimination analysis, adjusting discrimination parameters, and/or data recording, as will be more fully described hereinbelow. In response to analysis of the input information, processor/discrimination unit 26 controls actuation, or deployment, of one or more passenger safety restraints, such as an airbag 38, via at least one output line 28, or the activation of an audible or visual warning device(s) 40 via at least one output line 30 for alerting the vehicle occupant 24 to a potentially hazardous seating condition. The infrared position detector 12 and the signal processor 26 receive power from a vehicle battery 32.

The system 10 is mounted on and/or in the vehicle steering column or dashboard. In a crash, the system 10 will experience essentially the same decelerations as a conventional electromechanical acceleration sensor, i.e., "accelerometer." However, the occupants are not rigidly affixed to any cabin structure, and therefore, an occupant's motion, or reaction to a crash will be somewhat different from a conventional accelerometer. The system 10 will measure the relative distance and motion of the occupants relative to the fixed structure within the vehicle. As will be described more fully hereinbelow, advanced signal processing techniques performed in the processor/discrimination unit 26 will allow identification of those situations where deployment of a safety restraint is required. The system 10 is further able to recognize or identify occupant motion characteristic of seat belt usage, and to distinguish this type of motion from occupant motion where no seat belt is being used. Occupant motion recognition or identification through advanced signal processing techniques also enables the system 10 of the present invention to distinguish irrelevant, or spurious occupant motions such as a hand or arm moving through the incident beam.

In operation, a narrow infrared beam 34 is directed horizontally at the expected position of the driver or passenger. At least a portion of the light energy scattered by the occupant's clothing is detected by receiver 18, which is located away from the beam axis so that the receiver 18 can detect differences in reflected light intensity and angle associated with occupant absence, presence and forward motion. The infrared beam 34 is distinguished from ambient light of the same wavelength by modulating the signal 34. A modulation frequency of about 10 KHz or higher provides acceptable modulation since a minimum of 10 KHz is well within the range of most existing electronic and optical systems, and is fast enough to monitor passenger movement in real time. Determination of the instantaneous distance of the occupant from the transmitter 16 is based on the relative intensity of the light scattered by the occupant as detected by a detector or detectors, with measurements based on relative intensity or the angle from which the light is received.

Referring to FIG. 2, there is shown a first embodiment 100 for determining the position of an occupant based on the principle that light intensity is proportional to $1/r^2$, where r=distance of scattering surface from the receiver 18. In the $1/r^2$ embodiment 100, the receiver 18 comprises a pair of photodiode detectors 102 and 104 situated a known distance apart, and placed at different distances from the point where the incident light is reflectively scattered. The receiver 18 is preferably positioned relative to the transmitter 16 so as to produce a relatively small angle 8 between the transmitted beam 34 and the portion of the reflected beam impinging upon the receiver 18. In order to insure that the two photodiode detectors 102 and 104 are sensing light scattered from the same area, a beam splitter 108 will be used to direct half of the reflectively scattered light to one photodiode, and half to the other. The use of a beam splitter also serves to eliminate any angular variations within the plane of incidence. This helps to insure that the difference in distance is the only factor that affects the relative intensities of the light received by the photodiodes.

The structure of receiver 18 further comprises light passages 110 and 112 having light absorbing walls 114 for coupling the beam splitter 108 with detectors 102 and 104. The light absorbing walls 114 may further include baffling to further reduce light reflected to the detectors 102 and 104. The incident light beam 34 can be generated by a light emitting diode or semiconductor laser 116 located within the transmitter 16, and is subsequently collimated by a lens 118 to produce a light beam 34 that maintains a constant diameter of approximately one inch over a distance of 6 to 30 inches. The collimated beam 34 is then scattered in all directions by a reflecting surface 120, i.e., the vehicle occupant 24 if present.

Suppose that the distance between detectors 102 and 104 is L, and the distance from the point of reflective scattering to the closest photodiode 102 is x. Thus, under the principle of $1/r^2$, the intensity of the scattered light at the closer detector 102 is proportional to $1/x^2$, and the intensity of the scattered light at the other detector 104 is proportional to $1/(x+L)^2$. If the field of view is the same for both detectors, then:

$$I_1/I_2=(x+L)^2/x^2 \quad x=L/[(I_1/I_2)^{0.5}-1].$$

Thus, the ratio of the intensities sensed by the two photodiodes 102 and 104 serves as a measure of the distance x to the vehicle occupant.

It is noted that the $1/r^2$ relationship holds only for light that is randomly scattered from an object. The intensity of light that is specularly reflected does not diminish as a function of distance in the same way as scattered light. Fortunately, the specularly reflected light can be screened out by using polarizers. Since specularly reflected light tends to retain the polarization of the incident light, the incident light can be polarized in a particular direction, e.g., vertical, and the reflectively scattered light can be polarized in the complementary direction (horizontal). Because the reflectively scattered light is randomly polarized, polarization of the scattered light should permit about half of the light intensity to reach the detectors 102 and 104.

Referring to FIGS. 3(a)-(c), there is shown a second embodiment 200 for determining the position of an occupant based on triangulation of the received light intensity. Elements previously described have like reference numbers. More specifically, the collimated beam 34 which is scattered in all directions by the reflecting surface 120, i.e., the occupant, is focused by an imaging lens 202 to form a relatively small spot 204 on a Bi-cell detector 206. As shown in FIG. 3(b), the Bi-cell detector 206 comprises a pair of adjacent photodiode detectors 208 and 210. Since the lens 202 aperture selects the fraction of the scattered light that reaches the detector 206, the spot 204 on the detector moves when the angle $\alpha$ between the axis of beam 34 and the axis of the reflectively scattered light that reaches the detector changes, as shown in FIG. 3(c).

The direction of the reflected rays reaching the photodiode detectors 208 and 210 is determined by the positions of the center of the imaging lens 202 and the point where the reflecting surface 120 cuts the incident beam 32. Thus, the particular angle at which light is received at the photodiodes 208 and 210 depends only on the distance x to the reflecting surface. This angle $\alpha$ is determined by tan $\alpha=b/x$, where x is the distance from the source to the reflecting surface, and b is a predetermined lateral separation of the transmitter and the detector. As the angle varies, the relative amounts of radiant flux received by the two diodes 208 and 210 also varies. The diodes 208 and 210 generate respective current outputs $I_1$ and $I_2$ proportional to the relative amounts of light received by the diodes. Signal processing of the detector output currents comprises calculating the amplitude-independent ratio of currents to correct for reflection variation at the scattering surface 120. The ratio of the relative intensities determines the location of the spot 204 to provide a good measure of the angle $\alpha$, and hence the distance x to the reflecting surface 120.

Referring to FIGS. 4(a)-(c), there is shown a third embodiment 300 for determining the position of an occupant which employs triangulation of the received light intensity similar to embodiment 200, but replaces the Bi-cell detector 206 with a position sensitive detector (PSD) 302. The PSD 302, as shown in FIG. 4(b), is a distributed photosensitive device for which the difference in output currents $I_1$ and $I_2$ from the top and bottom ends 304 and 306 provides a linear measure of the spot's vertical position. As shown in FIG. 4(c), when the angle varies, the position at which the reflected light is imaged will vary across the PSD 302. The ratio of the two current outputs $I_1$ and $I_2$ varies as the center of light intensity moves across the PSD 302, and therefore provides a measure of the angle $\alpha$. The distance x to the occupant 24 can then be determined in a like manner as embodiment 200, described hereinabove.

Figure 5A:
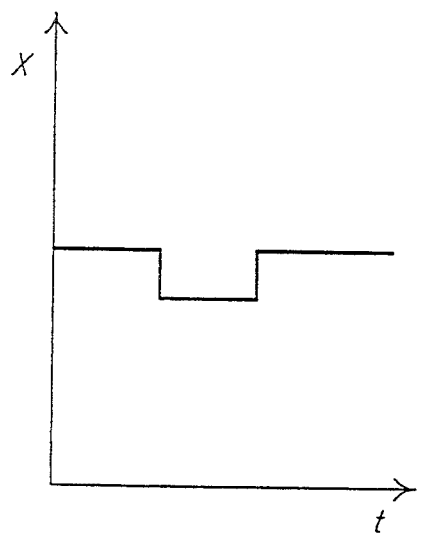
FIG. 5 is a schematic illustration of a fourth embodiment for detecting the occupant position based on the embodiments shown in FIGS. 3 (a)-(c) and FIGS. 4 (a)-(c)
Figure 5B:
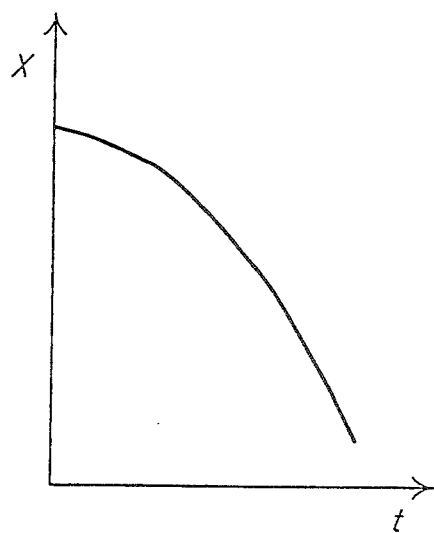

As shown in FIG. 5, a second receiver 308 having a Bi-cell detector or PSD 310, and a imaging lens 312, can be located on the opposite side of the collimated incident beam 34 from the first Bi-cell detector 206, or PSD 302. The arrangement shown in FIG. 5 can provide a more accurate detection of the occupant's position because the use of the additional receiver 308 located on the opposite side of the incident beam 34 compensates for shifts in the scattering angle caused by variations in reflectivity across the incident beam. More specifically, variations in reflectivity of the reflecting surface shift the center of the reflectively scattered light beam from the geometric center of the light beam. The shift in the center point can change the angle of the received light beam. The use of two separate receivers located on opposite sides of the incident beam allows the system 10 to make an accurate determination of distance despite any shifts in the center of the reflectively scattered light beam.

In accordance with the present invention, signal processor/discrimination unit 26 utilizes a parameter based algorithm which is capable of analyzing the information indicative of occupant position generated by the optical position detector 12 to determine crash situations, and/or adjust discrimination parameters. The data from optical position detector 12 can be stored and subsequently tracked relative to the fixed vehicle interior structure by signal processor 26 to determine various discrimination parameters such as occupant presence, occupant velocity (change in occupant distance over a period of time), occupant acceleration (change in occupant velocity over a period of time), and various occupant seating conditions, e.g., distance from potential impacts points such as the steering wheel or dashboard, occupant in a potentially dangerous position relative to the potential impact points, and occupant use of a seat belt. Determination of the use of a seat belt can be predicted based on the measured occupant velocity or acceleration.

Further, decision parameters such as the particular decision window allowable for performing a discrimination analysis can be adjusted in accordance with the specific detected occupant condition to improve the efficiency of the discrimination analysis and the actuation of the safety restraint. Also, since the processor 26 stores and tracks the position information with respect to time, irrelevant occupant movements, such as hand waving, arm movement, etc., can be differentiated from movement caused by a crash situation. This is illustrated in FIG. 6(a), which shows a plot of occupant position-versus-time data representative of an arm waving relative to a fixed structure within the vehicle, and FIG. 6(b), which shows a plot of data representing an occupant during a crash situation relative to the same fixed structure. Therefore, with the present invention, the vehicle crash discrimination system 10 is designed to provide high frequency measurements of the position of the driver and/or passengers relative to potential impact points such as the steering wheel and dashboard, and to process that information so as to optimize the safety restraint deployment decision. The system can refrain from deploying an airbag when a person is too close. The explosive force with which an airbag is inflated is capable of doing substantial harm to a person who is in close proximity to the airbag. Thus, the present invention can prevent injuries by refraining from deploying the airbag.

The system 10 also measures the actual position, velocity, and acceleration of the occupants relative to the potential impact points within the vehicle, and using these measurements in conjunction with advanced signal processing techniques, the present invention greatly increases the amount of information useful in the deployment decision. The present invention also significantly improves the crash discrimination analysis by supplying position information of a vehicle occupant which can be used in real time to adjust decision parameters such as allowable time-to-fire time periods and threshold values. The ability to adjust decision parameters allows the system to customize deployment decisions to suit specific occupant situations.

It is worth illustrating this aspect of the present invention with several examples. Consider, first, a marginally low velocity crash in which the vehicle occupant is wearing a seat belt. If there is no information concerning the actual motion of the occupant available to the discrimination analysis, the discrimination system must make a worst-case assumption, i.e., no seat belt usage, and deploy the airbag. Since the seat belt prevents the occupant from striking anything with injury-causing force, deployment of the airbag in this situation is actually unnecessary, and undesired.

In a second situation, a driver may sit closer than average to the steering wheel, but still outside the inflation zone. The actual time-to-fire an airbag in this situation is less than the standard required time-to-fire, since that standard is based on the time it takes the average person sitting an average distance away from the steering wheel to move within the inflation zone. By measuring the actual distance to the person, the present invention can adjust the decision window of the discrimination analysis to shorten the actual time-to-fire and deploy the airbag somewhat early to protect the driver from hitting the steering wheel, and to prevent injury from the inflating airbag. In addition, threshold values used in the discrimination analysis can be reduced in response to a driver sitting closer than average to the steering wheel.

In a third situation, a driver may sit at a somewhat greater than average distance from the steering wheel. In this situation, the actual time-to-fire the airbag is preferably longer than the standard required time-to-fire. The decision window of the discrimination analysis can then be adjusted to lengthen the actual time-to-fire to provide additional time in the discrimination analysis for analyzing more information. The ability to analyze more information provides a more reliable decision. Further, threshold values used in the discrimination analysis can be increased because of the increased distance between the driver and the potential impact point.

It is further noted that if a plurality of occupant position detectors are installed in the vehicle along with data recording devices, an analytical study can be made by tracing how human bodies move in response to real world crashes. Thus, the occupant position information retrieved from the recording devices can generate more detailed knowledge of how people move in crashes, and the ability to trace that movement in real time could lead to the development of new advances in passenger safety restraints.

Referring now to FIG. 7, there is shown a further embodiment of the passenger condition discrimination system 10 incorporating a supplemental optical, low threshold safing sensor 400. The safing sensor 400 comprises a housing 402 having a cylindrical passage 404 formed therein, and a magnetic sensing mass 402 in the passage 404 which is magnetically biased by a magnetically permeable element 408 to an initial position against a stop element 410 located at a first end within the passage 404. The sensing mass 406 is displaced in response to acceleration of the housing 402 from the initial position to a second position within the passage when such acceleration overcomes the magnetic bias of the sensing mass. Damping means such as an electrically conductive ring 412, for example a copper tube, encompasses the passage 404 to provide magnetic damping for the sensing mass 406 during the displacement of the magnetic sensing mass within the passage 404. The magnetic sensing mass 406 of safing sensor 400 functions in a manner similar to the magnetically-damped, testable accelerometer as taught in commonly assigned U.S. Pat. No. 4,827,901 to Behr, incorporated herein by reference.

As shown in FIG. 7, a portion of the collimated incident beam 34 is supplied by suitable optical coupling structure such as a beam splitter 414 and mirror 416, or alternatively a fiber optic cable, to a second end of the passage 404. The collimated incident beam is horizontally redirected down the passage 404 where the beam is reflectively scattered by a scattering surface 418 of known reflectivity, e.g., cloth, affixed to an end face of the sensing mass 406. A receiver 420 comprising an infrared detector 422 and synchronous demodulator 424 is positioned relative to second end of the passage 404 so as to receive at least a portion of the reflectivity scattered light. The distance d of the sensing mass 406 relative to the fixed incident light source can be calculated by detecting the intensity of the scattered light as described hereinabove with respect to FIGS. 2-4. The data obtained by the synchronous demodulator 424 is provided as an output 426 to the signal processor/discrimination unit 26 for storage and/or analysis.

The safing sensor 400 of the present invention provides several advantageous functions for the vehicle crash discrimination system 10. First, the safing sensor 400 provides a way of calibrating the system 10. The intensity of the light scattered by the sensing mass 406 while at the initial position will be substantially constant, thereby allowing corrections or adjustments to the transmission of the incident light beam 34. Further, since the scattering surface 418 affixed to the end of the sensing mass 406 has a known reflectivity, the system 10 will be able to detect a condition where an occupant is providing a low reflection of the incident beam 34, such as an occupant wearing a material of low reflectivity like black velvet, based on a comparison of the respective outputs 22 and 426. Thus, the system 10 can make appropriate corrections for the occupant's low reflectivity.

Second, the safing sensor 400 supplements the signal processor/discrimination unit 26 in discerning spurious occupant movement, such as a hand waving in front of the receiver 18. Signal processor 26 may detect movement of the occupant because of the data generated by receiver 18. However, if the sensing mass 406 in the safing sensor 400 does not move, the signal processor 26 can assume the occupant movement was not in response to vehicle acceleration.

Third, the safing sensor 400 provides additional data for use in the discrimination analysis since the data generated at output 426 in response to the movement of the sensing mass 406 can be differentiated twice with respect to time to determine vehicle acceleration. Vehicle acceleration data can then be utilized with the occupant condition/position data in the parameter based algorithm to provide more reliable crash discriminations and safety restraint actuations.

Preferably, the distance measurement of the sensing mass 406 movement should be based on how a frictionless sensing mass would react to vehicle acceleration. However, as described hereinabove, the safing sensor 400 employs both biasing and damping of the sensing mass 406 to permit the sensor 400 to be unaffected by conditions such as very low threshold crashes and rough road conditions. The biasing and damping of the sensing mass 406 provides inexact motion measurement data for signal processor unit 26. The effects of the biasing and damping on the sensing mass movement are well understood, and therefore in the present invention, the signal processor unit 26 preferably modifies the data from output 426 with a factor which effectively "undamps" the data before use in the discrimination analysis. Thus, a movement measurement based on a "frictionless" sensing mass is obtainable with the above described safing sensor 400.

While the preferred embodiments have been described using an active infrared position detector 12, it will be appreciated that an acceptable alternative active, or passive, sensing arrangement utilizing ultrasonic sensors or microwave sensors could be employed. It will be further understood that the foregoing description of the preferred embodiment of the present invention is for illustrative purposes only, and that the various structural and operational features herein disclosed are susceptible to a number of modifications, none of which departs from the spirit and scope of the present invention as defined in the appended claims.

We claim:

1. A method for optimizing a discrimination analysis used in a system for actuating a vehicle occupant safety restraint in response to a vehicle collision comprising the steps of:

continuously detecting a static position of a vehicle occupant relative to a fixed structure within the vehicle;

generating data representative of the detected static occupant position; and adjusting a discrimination threshold value used in the discrimination analysis for determining whether actuation of the safety restraint is required based on the data representative of the detected static occupant position.

2. The method of claim 1 further comprising the steps of:

detecting a change in the static vehicle occupant position; determining the velocity of the occupant based on the detected change in position;

comparing the occupant velocity to the predetermined discrimination threshold value; and actuating the safety restraint if the occupant velocity exceeds the threshold value.

3. The method of claim 1 further comprising the steps of:

receiving data representative of vehicle acceleration;
comparing the data representative of vehicle acceleration to the predetermined discrimination threshold value; and
actuating the safety restraint if the data representative of vehicle acceleration exceeds the threshold value.

4. The method of claim 1 wherein the step of detecting the static position of a vehicle occupant comprises the steps of transmitting a beam of light at a designated area within the vehicle potentially occupied by a person;
receiving at least a portion of the light beam which is reflectively scattered by a surface within the designated area;
measuring an intensity level of at least a portion of the received light beam, or an angle from which the light beam is received; and
determining the distance between the scattering surface and a fixed structure within the vehicle based on the measured intensity level or angle.

5. The method of claim 4 wherein the step of determining the distance between the scattering surface and the fixed structure comprises:
detecting the intensity level of the reflectively scattered light beam at two different locations separated by a predetermined distance; and
determining the distance between the scattering surface and the fixed structure based on a ratio of the intensity levels detected at the two different positions.

6. The method of claim 4 further comprising the steps of:
directing at least a portion of the light beam at a first end of an inertial sensing mass in a means for sensing the acceleration of the vehicle, said inertial sensing mass being movable from a first position to a second position in response to an applied acceleration force, said first end comprising a material having a known reflectivity;
measuring an intensity level of at least a portion of the light beam which is reflectively scattered by the first end of the inertial sensing mass; and
detecting movement of the inertial sensing mass from the first position to the second position based on the measured intensity level of the light reflectively scattered by the first end of the inertial sensing mass.

7. The method of claim 4 wherein the step of determining the distance between the scattering surface and the fixed structure comprises:
transmitting the beam of light from a first location within the vehicle;
imaging the reflectively scattered light beam to form a spot on a detector means located at a second location, the first and second locations being separated by a predetermined distance, said detector means providing an output indicative of the location of the spot on said detector means;
determining an angle from which the reflectively scattered light beam is received based on the location of the spot on the detector means; and
determining the distance between the scattering surface and the fixed structure based on the angle from which the reflectively scattered light is received.

8. The method of claim 7 wherein the imaging step comprises imaging the reflectively scattered light beam to form a spot on each of a plurality of detector means positioned and oriented to receive the reflectively scattered light at different respective angles; and
determining the distance between the scattering surface and the fixed structure based on the plurality of determined angles, thereby reducing any effect on the reflectively scattered light beam from varying reflectance patterns on the scattering surface.

9. A method of actuating a vehicle safety restraint comprising the steps of:
transmitting a beam of light at a designated area within the vehicle potentially occupied by a person;
measuring a relative intensity level or average of scattering angles of at least a portion of the light beam which is reflectively scattered by a surface within the designated area;
determining the distance between the scattering surface and a fixed structure within the vehicle based on the measured relative intensity level or average of scattering angles;
determining a change in distance between the scattering surface and the fixed structure over a period of time;
adjusting a discrimination threshold value used for discriminating whether safety restraint actuation is desired based on the distance between the scattering surface and the fixed structure;
comparing the change in distance between the scattering surface and the fixed structure over a period of time to the predetermined threshold value; and
actuating the safety restraint if the change in distance exceeds the threshold value.

10. A system for actuating a vehicle occupant safety restraint in response to a vehicle collision comprising:
means for continuously detecting a static position of a vehicle occupant relative to a fixed structure within the vehicle;
means responsive to the detecting means for generating data representative of the detected static occupant position; and
processor means comprising a means for discriminating a vehicle crash requiring actuation of the occupant safety restraint, said discrimination means having a predetermined discrimination threshold value for use in the discrimination analysis, and
a means responsive to the data representative of the detected static occupant position for adjusting the discrimination threshold value.

11. The system of claim 10 wherein said processor means further comprises:
means for detecting a change in the static vehicle occupant position;
means for determining the velocity of the occupant based on the detected change in position;
means for comparing the occupant velocity to the predetermined discrimination threshold value; and
means for actuating the safety restraint if the occupant velocity exceeds the threshold value.

12. The system of claim 10 further comprising:
means for receiving data representative of vehicle acceleration; and
said processor means further comprising a means for comparing the data representative of vehicle acceleration to the predetermined discrimination threshold value, and means for actuating the safety restraint if the data representative of vehicle acceleration exceeds the threshold value.

13. The system of claim 10 wherein said static position detecting means comprises:
- means for transmitting a beam of light at a designated area within the vehicle potentially occupied by a person;
- means for receiving at least a portion of the light beam which is reflectively scattered by a surface within the designated area;
- means for detecting the intensity level of the received light beam at two different locations separated by a predetermined distance; and
- means for determining the distance between the scattering surface and the fixed structure based on a ratio of the intensity levels detected at the two different locations.

14. The system of claim 10 wherein said static position detecting means comprises:
- means positioned at a first location within the vehicle for transmitting a beam of light at a designated area within the vehicle potentially occupied by a person;
- a detector means positioned at a second location, the first and second location being separated by a predetermined distance;
- means for imaging at least a portion of the light beam which is reflectively scattered to form a spot on said detector means, said detector means providing an output indicative of the location of the spot on said detector means;
- means responsive to said detector means output for determining an angle from which the reflectively scattered light beam is received; and
- means for determining the distance between the scattering surface and the fixed structure based on the determined angle.

15. The system of claim 10 wherein said static position detecting means comprises:
- means positioned at a first location within the vehicle for transmitting a beam of light at a designated area within the vehicle potentially occupied by a person;
- a plurality of detector means each positioned at different locations, each different location being separated from the first location by a predetermined distance;
- means for imaging at least a portion of the light beam which is reflectively scattered to form a spot on each of said plurality of detector means, said plurality of detector means providing an output indicative of the location of the spot respectively formed thereon;
- means responsive to said plurality of detector means outputs for determining an angle from which the reflectively scattered light beam is respectively received at each of said plurality of detector means; and
- means for determining the distance between the scattering surface and the fixed structure based on the plurality of determined angles, thereby reducing any effect on the reflectively scattered light beam from varying reflectance patterns on the scattering surface.

16. The system of claim 10 wherein said static position detecting means comprises:
- means for transmitting a beam of light at designated area within the vehicle potentially occupied by a person;
- means for receiving at least a portion of the light beam which is reflectively scattered by a surface within the designated area;
- means for measuring an intensity level of at least a portion of the received light beam, or an angle from which the light beam is received; and
- means for determining the distance between the scattering surface and a fixed structure within the vehicle based on the measured intensity level or angle.

17. The system of claim 16 further comprising:
- means for sensing the acceleration of the vehicle having an inertial sensing mass movable from a first position to a second position in response to an applied acceleration force, said inertial sensing mass having a first end comprising a material of known reflectivity;
- means for directing at least a portion of the transmitted light beam at said first end of said inertial sensing mass;
- means for measuring an intensity level of at least a portion of the light beam which is reflectively scattered by said first end; and
- means for detecting movement of said inertial sensing mass from the first position to the second position based on the measured intensity level of the light reflectively scattered by said first end.

* * * * *

UNITED STATES PATENT AND TRADEMARK OFFICE
CERTIFICATE OF CORRECTION

PATENT NO. : 5,446,661
DATED : August 29, 1995
INVENTOR(S) : Tony Gioutsos, et al It is certified that error appears in the above-identified patent and that said Letters Patent is hereby corrected as shown below:

Col. 6, line 4, after "$I_1/I_2=(x+L)^2/x^2$" insert "-->".
Col. 6, line 17, after "e.g." delete the period.
Col. 6, line 36, before (between" delete "a" and insert --$\alpha$--.
Col. 6, line 43, after "angle" insert --$\alpha$--.
Col. 6, line 45, after "this" delete [a].
Col. 6, line 46, after "angle" insert --$\alpha$--.
Col. 6, line 59, delete "a" and insert --$\alpha$--.
Col. 7, line 3, after "angle" insert --$\alpha$--.
Col. 8, line 7, delete "a" and insert --$\alpha$--.
Col. 11, line 2, Claim 3, "comparing the data..." should begin a new subparagraph.

Signed and Sealed this

Ninth Day of January, 1996

Attest:

BRUCE LEHMAN

Attesting Officer

Commissioner of Patents and Trademarks